June 11, 1935.  R. C. PALICKI  2,004,382

WORK GLOVE

Filed Feb. 18, 1935

Inventor

Robert C. Palicki

By Owen & Owen

Attorneys

Patented June 11, 1935

2,004,382

UNITED STATES PATENT OFFICE 2,004,382

WORK GLOVE

Robert C. Palicki, Toledo, Ohio

Application February 18, 1935, Serial No. 6,943

3 Claims. (Cl. 2—164)

This invention relates to work gloves or gauntlets, and an object is to produce a new and improved glove having the features of construction and arrangement hereinafter described, which cooperate to provide insulation and padding for the palm and greatly increase the life, durability and strength of the glove.

Figure 1:
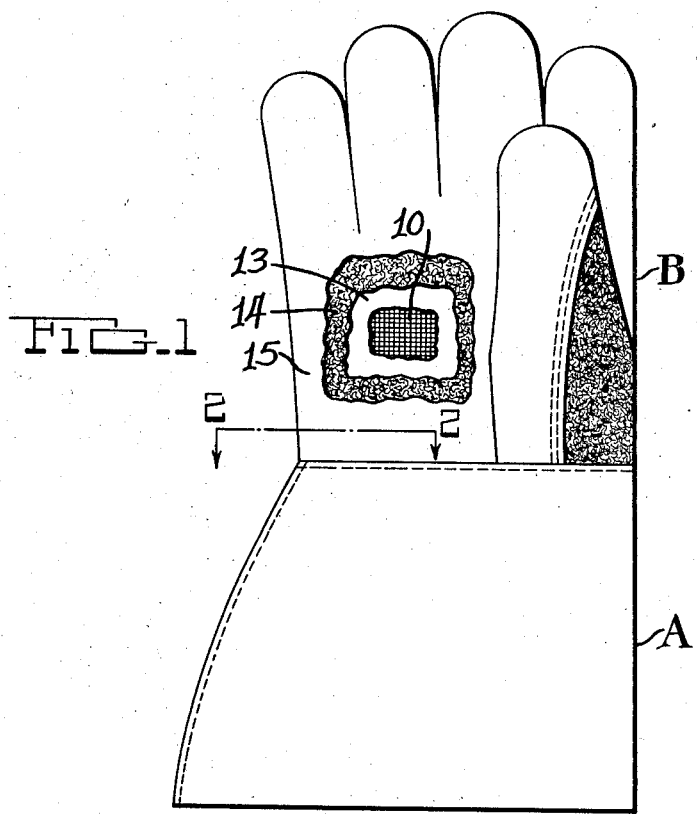
Figure 2:
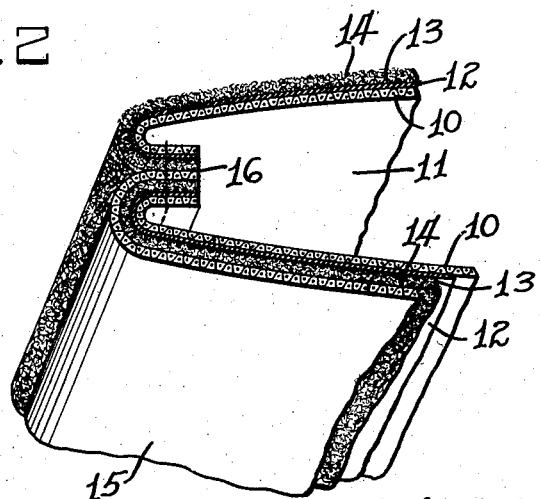

Further objects and advantages will hereinafter appear, and an embodiment of the invention is shown on the accompanying drawing, in which:

Figure 1 is a plan view of the palm side of a gauntlet with the palm broken away to show the several plies; and Figure 2 is an enlarged fragmentary section on the line 2—2 of Figure 1.

The illustrated embodiment of the invention comprises a gauntlet having a cuff portion A and a hand portion B. The cuff portion may be of any suitable material, such, for example, as canton flannel suitably starched, and is sewed in the usual manner to the hand portion B.

The hand portion B is composed of several plies, the inner ply 10 being of textile material, such as flannel, which has an inner fleecy surface 11 presenting a soft comfortable feeling to the hand. To the ply 10 is applied a coating 12 of rubber solution which is water and chemical resistant, and serves also to bind the ply 10 to the next outer ply 13, which is also of textile material, such as flannel. The outer surface of the ply 13 is fluffed up considerably so as to provide a relatively thick wool-like surface 14, this being accomplished, for example, by brushing the surface with a wire brush so that the fibers on the outer side are loosened and form a soft, fluffy, yieldable surface with some resilience so as to return to its normal position after pressure against it is relieved.

The surface 14 on the back of the glove is to present an attractive appearance, but on the palm it has important advantages from the standpoint of use, as will hereinafter appear. Covering the palm and front of the fingers is a ply 15 of leather, or some similar material, of good wearing qualities, and capable of withstanding hard usage. The ply 15 is free from the subjacent ply except at the side portions 16 which are inturned and sewed together, as shown, the lines of sewing connecting the ply to the fingers in similar inturned fashion, and the lines of sewing connecting the same to the thumb portion.

It is to be understood that except for the lines of attachment above mentioned, the ply 15 is free with respect to the under plies so that in use relative movement may take place between the outer ply and the remaining ones. This is of importance because it eliminates friction between these parts and increases the life of the glove since wear does not take place so quickly, as well as affords greater flexibility.

A cardinal feature resides in the interposition of the light fluffy ply 14 between the relatively free outer ply 15 and the rubber ply 12. This affords insulation between these parts, assisting in keeping heat and cold from the hands of the person. This soft ply also affords a padding which assists in resisting impact against the ply 15. Furthermore, by keeping the outer ply 15, in case of leather, from the rubber ply it prevents these plies from sticking together, which would make the glove less flexible, and, therefore, less satisfactory for workmen. Contact between the leather and rubber has been found to rot the leather after a relatively short period, and thereby reduce the wearing qualities of the glove. Gloves of this character are used to a large extent by linemen, and by providing some space and insulation between the outer ply and the rubber ply, a safety factor is provided since this structure militates against the rubber ply being so easily ruptured.

It is to be understood that numerous changes in patterns and details of construction and choice of materials may be made without departing from the spirit of the invention, especially as defined in the appended claims.

What I claim as new and desire to secure by Letters Patent is:

1. A work glove comprising a back and front having a pair of plies of textile material, a rubberized layer between and binding said plies together, the outer of said plies on the front having a fluffy, wool-like resilient surface, and a relatively thick leather ply on the front covering said wool-like surface, said wool-like surface providing an insulation between the outer ply and the remaining plies and also providing a padding for cushioning impact against the outer ply.

2. A work glove comprising a back and front having a pair of plies of textile material, a rubberized layer between and binding said plies together, the outer of said plies on the front having a fluffy, wool-like resilient surface, and a relatively thick leather ply on the front covering said wool-like surface, said wool-like surface providing an insulation between the outer ply and the remaining plies and also providing a padding for cushioning impact against the outer ply, the palm portion of the outer leather ply being free and relatively movable with respect to the subjacent plies.

3. A work glove including a front having a pair of plies of textile material, a rubberized layer between and securing said plies together, the outer of said plies having a fluffy, wool-like resilient surface, and a relatively thick leather ply covering said wool-like surface and having the major portion thereof free from and relatively movable with respect to said wool-like surface.

ROBERT C. PALICKI.